N. A. COBB.
AUTOMOBILE GEAR LOCK.
APPLICATION FILED JUNE 6, 1916.
1,206,673.
Patented Nov. 28, 1916.
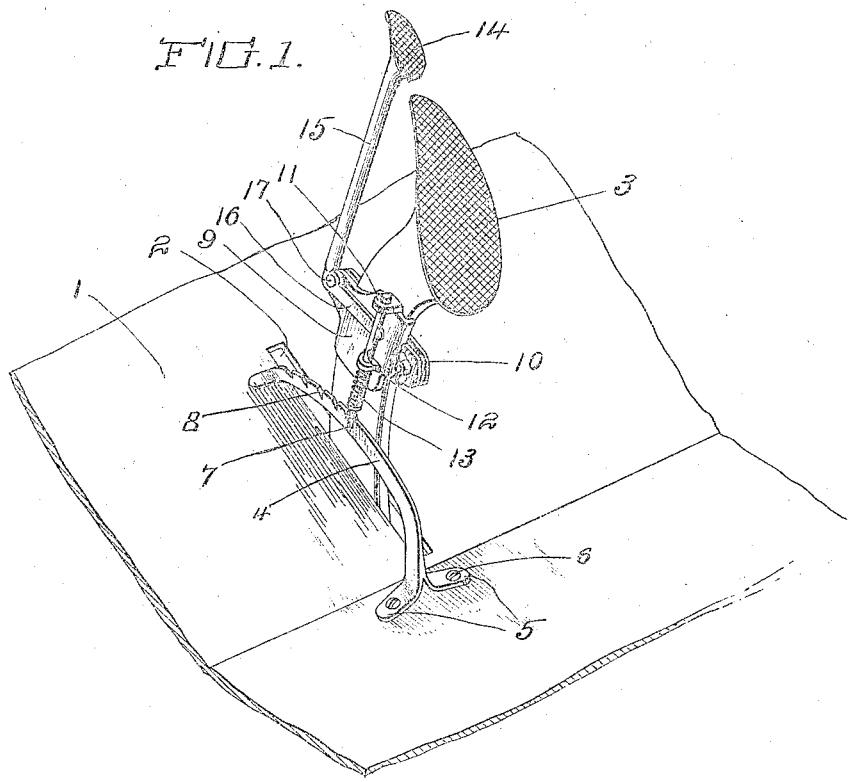
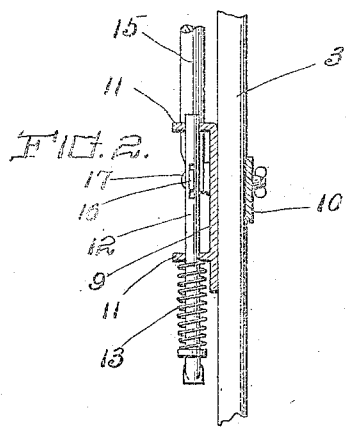
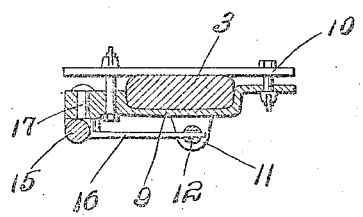
Witnesses
A. C. Newkirk
Inventor
N. A. Cobb
By Victor J. Evans
Attorney

UNITED STATES PATENT OFFICE.

NORMAN A. COBB, OF LITTELL, WASHINGTON.

AUTOMOBILE GEAR-LOCK.

1,206,673.   Specification of Letters Patent.   Patented Nov. 28, 1916.

Application filed June 6, 1916.  Serial No. 101,930.

*To all whom it may concern:*

Be it known that I, NORMAN A. COBB, a citizen of the United States, residing at Littell, in the county of Lewis and State of Washington, have invented new and useful Improvements in Automobile Gear-Locks, of which the following is a specification.

This invention is an improved neutral and low gear lock for automobile clutch pedals, especially clutch pedals of Ford automobiles, the object of the invention being to provide improved devices of this kind for use in connection with a clutch pedal to hold the clutch in neutral position when coasting down long hills or when stopping and to also hold the clutch in low gear on long steep hills or bad roads and also avoid the necessity of letting go the steering wheel to pull up the emergency brake lever.

The invention consists in the features of construction, combination, and arrangement of devices, hereinafter fully described and claimed.

In the accompanying drawings:—Figure 1 is a perspective view of a Ford clutch pedal provided with a neutral and low gear lock, constructed and arranged in accordance with my invention. Figs. 2 and 3 are detail sectional views.

For the purposes of this specification, a portion of the floor of a Ford automobile is indicated at 1 provided with the usual slot 2 and the usual Ford clutch pedal is indicated at 3. In accordance with my invention, a rack bar 4 which is arranged at one side of the clutch pedal and parallel therewith and is here shown as provided with feet 5 which are secured to the floor by means of screws 6. The rack bar is provided with a neutral notch 7 and also with a low gear notch 8.

A plate or base member 9 of suitable construction, is secured to the clutch pedal by a clamp 10 and is provided with outstanding guide lugs 11 for a catch bolt 12 which may be engaged with either the neutral notch or the lock gear notch by means of a spring 13. I also provide a clutch lock pedal 14 which is provided with a long arm 15 and a short arm 16 at an angle to the long arm, said clutch lock pedal being pivotally mounted in its angle on the plate or base 9, as at 17. The short arm of the clutch lock pedal engages in a slot or offset in the catch bolt.

It will be understood that when the clutch pedal is arranged either in neutral position or in low gear position, the catch bolt will engage the neutral or low gear notch as the case may be and thereby hold the clutch pedal in such position, greatly facilitating the comfort of the chauffeur and dispensing with the necessity of releasing the steering wheel to pull up the emergency brake lever. By first operating the clutch lock pedal, the catch bolt may be disengaged from the notch of the rack bar to permit the desired movement of the clutch pedal as will be understood.

From the foregoing description, taken in connection with the accompanying drawings, the advantages of construction and of the method of operation will be readily apparent to those skilled in the art to which the invention relates, and while I have described the principles of operation of the device together with the device which I now consider to be the best embodiment thereof, I desire to have it understood that the device shown is merely illustrative and that such changes may be made when desired as are within the scope of the claims appended hereto.

Having described the invention, what is claimed is:

1. In combination with an automobile clutch pedal, a rack bar having neutral and low gear notches, a catch bolt carried by said pedal and arranged to engage either of said notches, and a clutch lock pedal arranged in front of the clutch pedal and having a downwardly extending arm and a rearwardly extending arm, said clutch lock pedal being pivotally mounted, at the angle between its arms on said clutch pedal, and the rearwardly extending arm of the clutch lock pedal being connected to and adapted to operate the catch bolt.

2. In combination with the clutch pedal of a Ford automobile, a rack element adapted to be fixedly mounted near one side of the clutch pedal, a base element provided with means for securing said base element to said clutch pedal, a catch bolt mounted in guides on said base element, a spring to engage said catch bolt with either of the notches of the rack element and a clutch lock pedal arranged in front of the clutch pedal and having a depending long arm and a rearwardly extending short arm, said clutch lock pedal being pivotally mounted at the angle between its arms on said base and the rear arm of said clutch lock pedal being connected to said catch bolt to actuate the latter.

In testimony whereof I affix my signature.

NORMAN A. COBB.